Nov. 20, 1934.　　　D. MOWAT　　　1,981,370
FILM FEEDING MECHANISM
Filed May 22, 1930　　　4 Sheets-Sheet 1
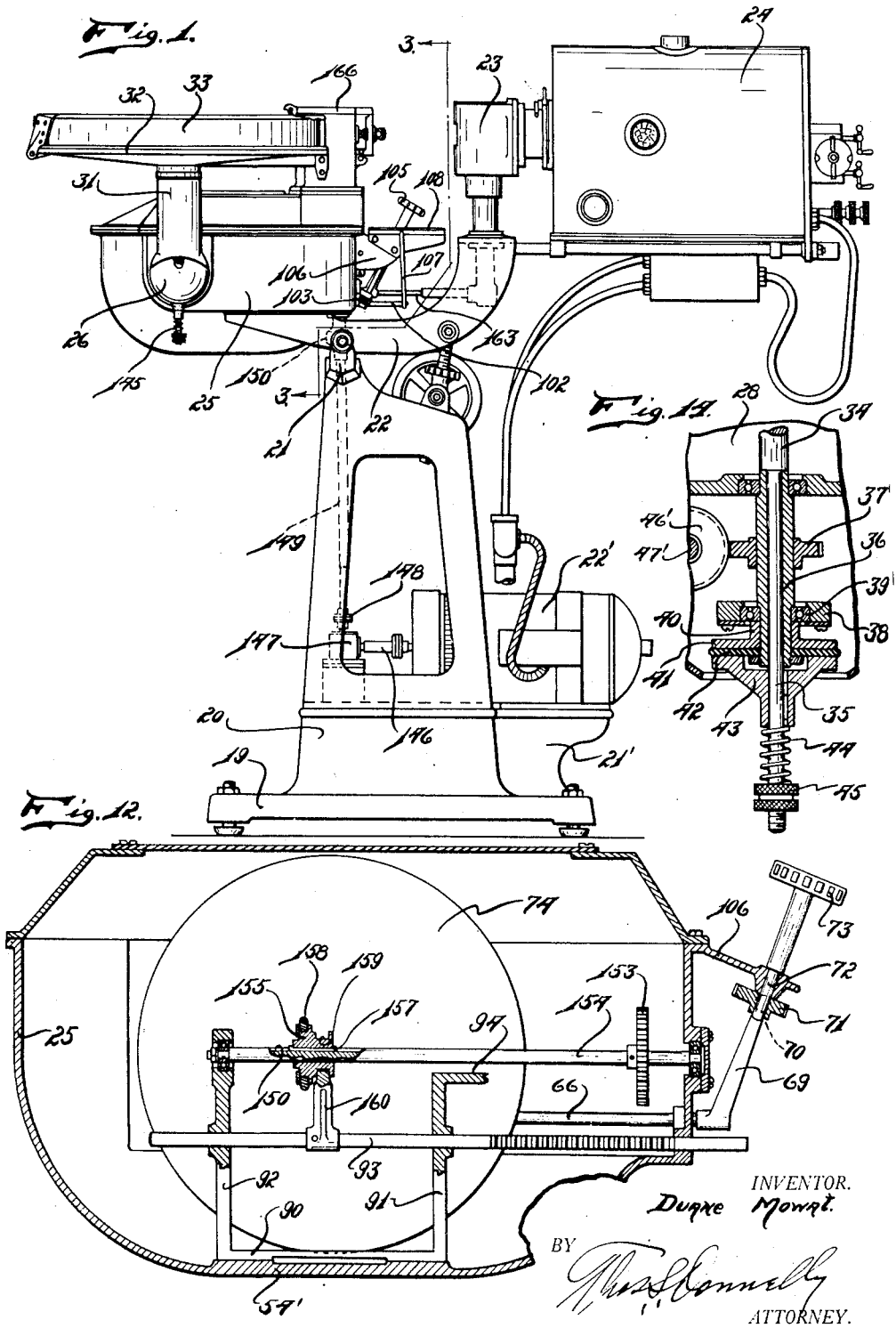

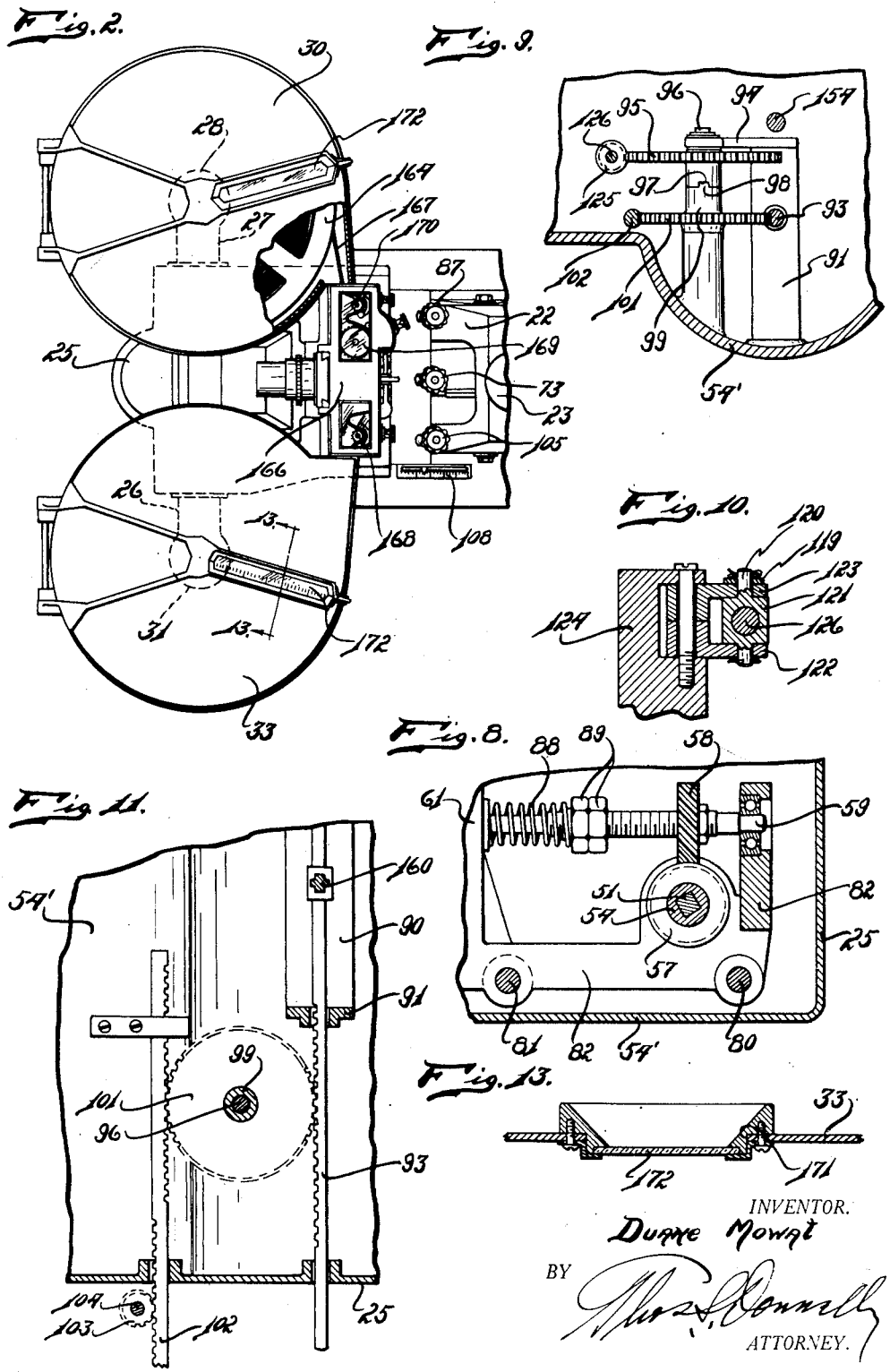

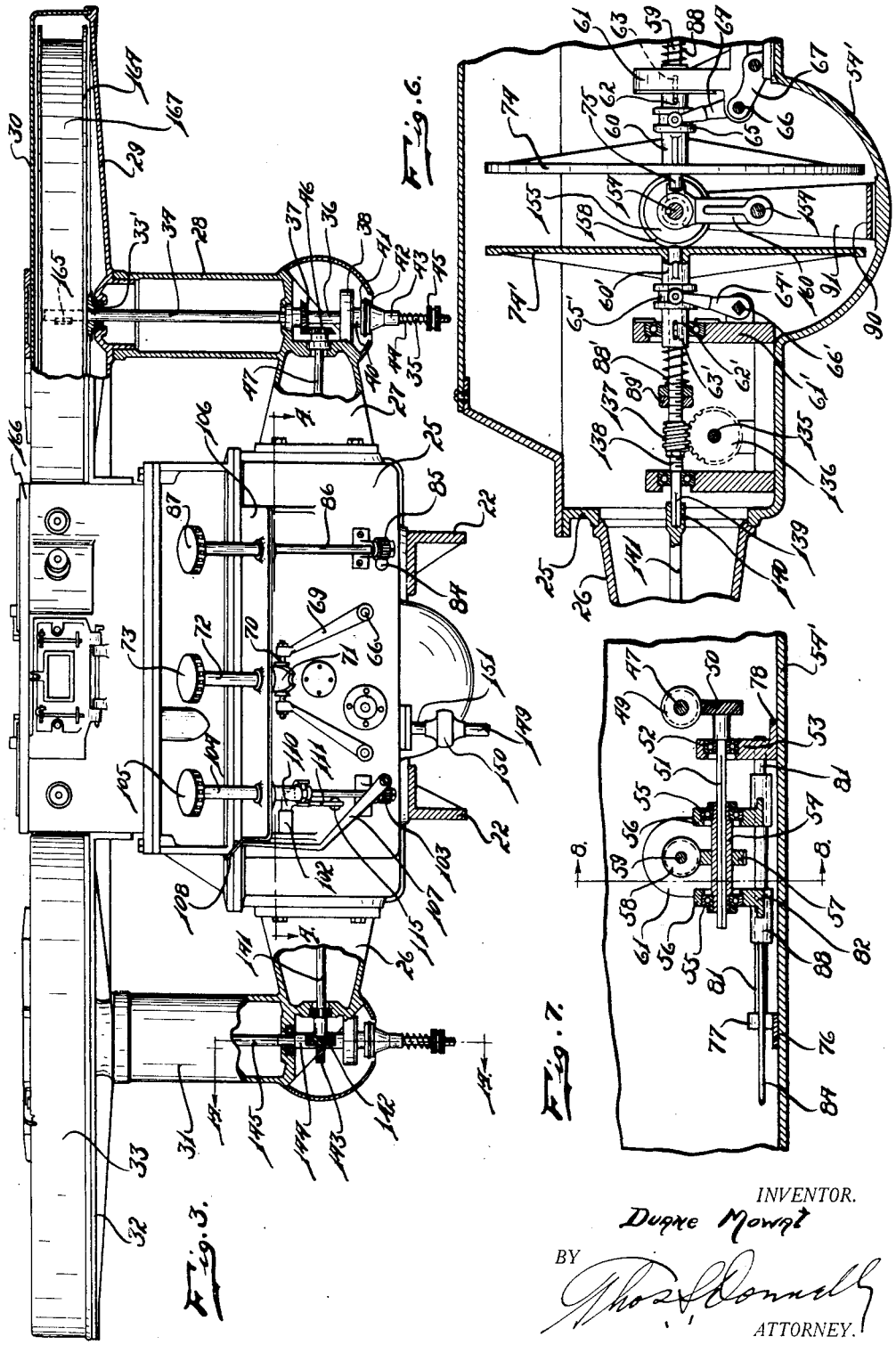

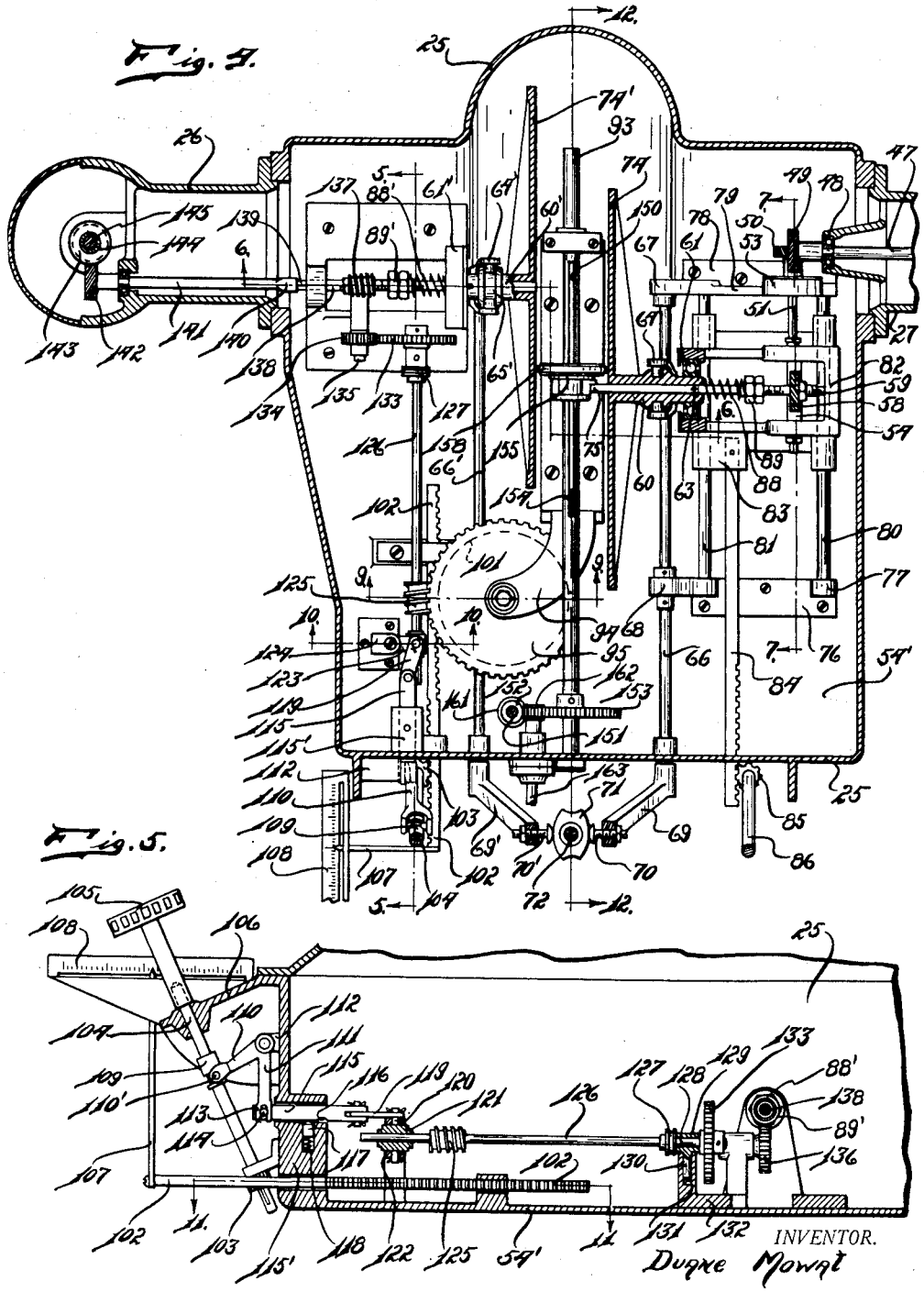

Patented Nov. 20, 1934

1,981,370

UNITED STATES PATENT OFFICE 1,981,370

FILM FEEDING MECHANISM

Duane Mowat, Detroit, Mich., assignor to Harry F. Vickers, Detroit, Mich.

Application May 22, 1930, Serial No. 454,602

20 Claims. (Cl. 242—55)

My invention relates to a new and useful improvement in a film feeding mechanism for projecting machines, used in that type of picture projecting machine in which the film is fed from one reel to another across an aperture through which the light is projected for casting the image upon the screen. It is an object of the present invention to provide a feeding mechanism whereby the film in passing the aperture, will travel horizontally.

It is another object of the invention to provide a film and feeding mechanism so arranged that a maximum picture area may be obtained on a film of minimum width and the advantages of a larger area of picture may be obtained. These advantages are principally, a clearer image when cast on the screen, more natural representation of the images, a maintaining of the images more closely approaching life size, a proper relation between the various objects in the image, more natural setting of the objects in the image, an increase in length of sound tract, and an increase of depth of the images, so that more life like representation is attained.

Another object of the invention is the provision of a film feeding mechanism which will maintain a constant peripheral speed of the film and in which there may be also obtained a variable setting so that reels of different sizes may be used in the projecting machine with a minimum amount of adjusting which may be easily and quickly effected.

Another object of the invention is the provision in a feeding mechanism whereby a compensating action may take place so that the speed of the winding and unwinding of the reel may be so propelled automatically as to maintain a constant peripheral speed.

Another object of the invention is the provision of a film feeding mechanism whereby a positive feed may be obtained on both reels.

Another object of the invention is the provision in a positive feed film mechanism of relief means whereby, should a reel become dislocated as to its position of rotation relatively to the other reel, the relief means will permit an automatic self-adjustment to regain the desired proportionate location.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of a projecting machine embodying the invention.

Fig. 2 is a fragmentary top plan view of the invention with parts broken away.

Fig. 3 is a view taken on line 3—3 of Fig. 1.

Fig. 4 is a fragmentary sectional view taken on line 4—4 of Fig. 3.

Fig. 5 is a fragmentary view taken on line 5—5 of Fig. 4.

Fig. 6 is a fragmentary view taken on line 6—6 of Fig. 4.

Fig. 7 is a fragmentary view taken on line 7—7 of Fig. 4.

Fig. 8 is a sectional view taken on line 8—8 of Fig. 7.

Fig. 9 is a fragmentary view taken on line 9—9 of Fig. 4.

Fig. 10 is a fragmentary view taken on line 10—10 of Fig. 4.

Fig. 11 is a view taken on line 11—11 of Fig. 5.

Fig. 12 is a view taken on line 12—12 of Fig. 4.

Fig. 13 is a view taken on line 13—13 of Fig. 2.

Fig. 14 is an enlarged sectional view taken on line 14—14 of Fig. 3.

I have illustrated the invention applied to a projecting machine supported on a standard 20 which projects upwardly from a base 19 carrying the lugs 21 at its upper end between which are pivotally mounted the supporting arms or cradle 22 supporting the projecting machine consisting of the shutter housing 23 and the lamp housing 24, which are positioned rearwardly of the housing 25 which encloses the film feeding mechanism. Projecting outwardly from the housing 25 at opposite sides are the housings 26 and 27 extending upwardly from which are the cylindrical sleeves or housings 31 and 28 respectively. The housing 28 serves as a support for the reel housing or magazine having the base 29 and the cover 30 swingably mounted thereon. The housing 31 serves as a support for the reel housing or magazine having the base 32 and the cover 33 swingably mounted thereon. As clearly appears in Fig. 3 these reel housings are positioned in a horizontal plane in alignment with each other and spaced apart. A bearing 33' is mounted in the base 29. The structure at opposite sides for supporting the reels in the housings 29 and 32 are similar. A shaft 34 is provided with a reduced portion 35 (see Fig. 14) which is loosely projected through the sleeve 36. Fixedly mounted on the sleeve 36 is a gear 37. The sleeve 36 projects through a bearing 39 mounted in the bracket 38. Fixedly mounted on the sleeve and extending through the bearing 39 is a hub 40 carrying a disc 41 on which is mounted a friction pad 42 adapted to engage the friction disc 43 which is slidably mounted and non-rotative on the reduced portion 35. A spring 44, engaging at one side an adjusting nut 45, serves normally to retain the friction disc 43 in engagement with the pad 42 so that, under normal conditions, while the shaft 34 is rotating, the sleeve 36 will also be rotating, to effect a rotation of the shaft 47 on which is fixedly mounted the gear 46 which meshes with the gear 37. This shaft 47 (see Fig. 4) is projected into a bearing 48, and fixedly mounted on the shaft 47 is a gear 49, meshing with the gear 50 which is fixedly mounted on the shaft 51, this shaft 51 being formed with flat faces and preferably square in cross section. As shown in Fig. 7, the shaft 51 projects through the bearing 52 mounted in the bracket 53 which projects upwardly from the housing base 54'. Bearings 55, mounted on the upwardly projecting brackets 56 on the slidable carriage 82, serve to support a sleeve 54 having a flat faced bore to accommodate the shaft 51 which is slidably projected therethrough so that a rotation of the shaft 51 will effect a rotation of the sleeve 54. Fixedly mounted on the sleeve 54 is a gear 57 meshing with the gear 58 which is fixedly mounted on the shaft 59. As shown in Fig. 4, the shaft 59 extends through a hub 60 which projects outwardly from one face of the driving friction disc 74. The hub 60 is journaled in the bearing 61 which is carried by the slidable carriage frame 82. Formed in opposite sides of the hub 60 are slots 62 (see Fig. 6) in which engage the pin 63 which is projected therethrough and extended through the shaft 59. Yoke arms 64 are provided with inwardly projecting trunnions (see Fig 4) which engage in a peripheral groove formed in the hub 60. These yoke arms are fixedly mounted on the shaft 66 which is journaled in the bearings 67 and 68. The shaft 66 projects through the wall of the housing and is provided with an upwardly outwardly projecting arm 69 carrying an adjusting contact screw 70 adjacent its outer end which is adapted to engage the periphery of the cam 71 which is fixedly mounted on the shaft 72 provided with the hand wheel 73 at its upper end. As shown in Fig. 4, the shaft 59 is provided with the portion 75 which projects outwardly beyond the face of the friction disc 74. A plate 76 is mounted on the base 54' of the housing and provided with the upwardly projecting brackets 68 and 77 and spaced from the plate 76 is a similar plate 78 having the flange 79 projecting upwardly therefrom. Connecting these plates are the guide rods 80 and 81 which project through the slide frame or carriage 82. A boss 83 is mounted on one side of this frame and secured to the boss and projecting outwardly therefrom is a rack bar 84 meshing with the gear 85 which is fixedly mounted on the shaft 86, which extends substantially parallel to the shaft 72 in spaced relation thereto and which is provided on its upper end with the hand grip wheel 87. By rocking the shaft 66 the hub 60 and the disc 74 may be moved axially, the spring 88 which is positioned in embracing relation on the shaft 59 serving to resist axial movement of these parts in one direction. Adjusting nuts 89 are threaded on the shaft 59 for the purpose of adjusting the tension of the spring 88.

Mounted on the base of the housing 54' is a U-shaped support comprising the base plate 90 projecting upwardly from which are the supporting legs 91 and 92 (see Fig. 12). A rack bar 93 is slidably projected through these legs 91 and 92 and as shown in Fig. 4 and Fig. 9, the leg 91 is provided with the angularly turned portion 94 which serves as a bearing for the shaft 96 on which is mounted the gear 95 having a recess 97 formed in its hub for receiving a tongue 98 projecting outwardly from the hub 99 of the gear 101. This gear 101 meshes with the rack bar 93 and also with the rack bar 102 which, as shown in Fig. 4 is provided adjacent one end with teeth on one edge and adjacent the opposite end with teeth on the opposite edge. As shown in Fig. 11 the teeth on the outer end of the rack bar 102 mesh with a gear 103, slidably and non-rotatably mounted on the shaft 104 which carries on its upper end the hand grip wheel 105. The shafts 104, 72, and 86 are substantially parallel and extend through the supporting plate 106 which projects outwardly from the housing 25. As shown in Figs. 4 and 5 a pointer 107 is mounted on the outer end of the rack bar 102 and adapted to cooperate with the graduation plate 108.

Fixedly mounted on the shaft 104 which is axially slidable within certain limits is a collar 109 having a peripheral groove in which engage trunnions 110' projecting inwardly from the fork 110 carried by the bell crank, the opposite end 111 of which is provided with the fork 113 embracing the pin 114 which extends from the bar 115 which is slidably mounted in a passage formed in the projection 115' of the housing. The bell crank is pivoted to the bracket 112. A peripheral recess 116 is formed in the bar 115 and adapted for the reception of the plunger 117 which is pressed outwardly by the spring 118 upon an axial slidable movement of the bar 115 to bring the recess 116 into registration with the plunger 117. A link 119 is pivotally connected at one end to one end of the bar 115 (see Figs. 4, 5, and 10). The opposite end of the link 119 is pivotally connected to a trunnion 120 projecting outwardly from a block 121 which is slidably mounted on the shaft 126. Arms 122 and 123 also are pivotally connected to the trunnions 120 and pivotally connected to a supporting block 124 mounted in the housing. The shaft 126 is provided with a flexible joint 127 connected to the shaft 128 extending through the sleeve 129 projecting outwardly from which is the pin 130 engaging in the socket 131 formed in the supporting bracket 132. A gear 133 is fixedly mounted on the shaft 128 and a worm 125 is fixedly mounted on the shaft 126 and adapted to mesh with the gear 95. This construction is such that upon an outward pulling of the shaft 104, the bell crank will be rocked to move the bar 115 outwardly to bring the recess 116 into registration with the plunger 117, thus, through the toggle action of the link 119 and the members 122 and 123, swinging the shaft 126 outwardly so as to disengage the worm 125 from the gear 95, the purpose of which will appear later.

The gear 133 meshes with the gear 134 mounted on the shaft 135. Fixedly mounted on the shaft 135 is a gear 136 (see Fig. 6) which meshes with the worm 137 fixedly mounted on the shaft 138. This shaft 138 is provided with a flat faced portion 139 engaging in a flat faced socket 140 formed on the shaft 141. Adjusting nuts 89' are threaded on the shaft 138 against which engages one end of a spring 88' the tension of which may be adjusted by threading of the nuts 89'. The opposite end of the spring engages a hub 60' having the oppositely positioned slots 62' in which engages the pin 63'. The hub is provided with the peripheral groove for reception of the trunnion 65' projecting inwardly from the fork 64' of the yoke which is fixedly mounted on the shaft 66', this shaft projecting outwardly of the housing and provided on its outer end with the arm 69' having the contact adjusting screw 70' for engaging the cam 71. A rocking of the shaft 66' will effect an axial movement of the hub 60' and the friction disc 74'.

Fixedly mounted on the shaft 141 (see Fig. 3) is a gear 142 meshing with a gear 143 mounted on the sleeve 144, corresponding in structure to the sleeve 36 illustrated in Fig. 14, the remaining structure being as illustrated in Fig. 14. The shaft 145 is provided with the reduced portion which extends through the sleeve 144, this shaft 145 extending upwardly through the reel housing base 32 in the same manner that the shaft 34 projects through the reel housing base 29.

As shown in Fig. 1, an electric motor 22' is mounted on the bracket 21' and the shaft is connected to a shaft 146 which extends into a gear housing 147 connected into which, through the flexible coupling 148 is the shaft 149 connecting by the universal joint 150 with the shaft 151. This shaft 151 (see Fig. 4) is provided with a gear 152 meshing with the gear 153 fixedly mounted on the main drive shaft 154. A friction drive wheel 155 is provided with a key 157 which engages in the longitudinally extending key-way 150 formed in the shaft 154. This friction drive wheel is provided on its periphery with a tire 158 formed from rubber or other suitable friction material. The friction drive wheel 155 is provided with peripheral groove 159 as shown in Fig. 12, in which engages one end of an arm 160 fixedly mounted on the rack bar 93.

Fixedly mounted on the shaft 151 (as shown in Fig. 4) is a gear 161 which meshes with the gear 162 fixedly mounted on the shaft 163 which projects outwardly and serves to drive the shutter mechanism in the housing 23.

When it is desired to use the invention, the covers 30 and 33 would be swung to open position and the reels 164 placed in position in the reel housings, the shafts 34 and 145 each having a projection 165 which would cause the reels to rotate in unison with the shafts. The cover 166 of the head would also be swung back and the film 167 arranged in position on the feeding sprocket 168, the loop sprocket 169 and the take-up sprocket 170. Each of the covers is provided with an opening 171 closed by a transparent closure 172, the transparent closure on the cover 33 being graduated to indicate the amount of film wound on the film reel.

As the film feeds from one reel to the other, since these reels are each positively driven, it is necessary that the speed be variable as the winding and unwinding is effected. The driving of each of the reels is effected by the friction driving wheel 155 through its engagement with the friction discs 74 and 74'. It will be noted from Fig. 4 that this friction drive wheel is on opposite sides of the centers of the friction discs 74 and 74' so that by slidable movement of the friction drive wheel on the shaft 154, this friction drive wheel will always approach the center of one disc and withdraw from the center of the other. When the film is first placed in the machine, the reel driven by the disc 74' will ordinarily have the greater amount of film thereon and consequently the speed of travel of that reel, as the winding and unwinding is to be proportionate, should be less than the speed of travel of the other reel. The friction drive wheel 155 will therefore engage the friction disc 74' at a position farther from its center than it will engage the friction disc 74. As the winding and unwinding proceeds the friction drive wheel will progress inwardly toward the center of the disc 74', thus approaching the periphery of the disc 74. This is effected by the slidable movement of the rack bar 93 which is in mesh with the gear 101 mounted on the same shaft as the gear 95. This gear is rotated in proportion to the shaft 138 and therefore in proportion to the rotation of the reel which is rotated by the disc 74'. It will be noted in Fig. 9 that as the rack bar 93 is moved in one direction by a rotation of the gear 101, the rack bar 102 will be moved in the opposite direction. In normal operation of feeding the film from one reel to another the rack bar 93 will move inwardly of the housing so as to cause the friction drive wheel 155 to approach the center of the disc 74' at the same time the rack bar 102 will be moved outwardly so as to move the pointer 107 along the graduation scale 108. In this way there is maintained always a constant peripheral speed of the film. Should, for any reason, the winding and unwinding of the film become disproportionate so that undue strain would be exerted on the film at either reel, the yielding clutch, through the disc 43 and the pad 42, would permit a slight slippage. The desired degree of strain set up before this slippage would occur could, of course, be adjusted by the adjusting nut 45.

In use, various lengths of film may be inserted in the machine and consequently when the operation of the machine is started the various amounts of film may be on the reel in the magazine having the base 32, and an initial adjustment of the feeding mechanism is necessary to maintain the proper proportion of speeds of the two reels. The amount of film on the unwinding reel will be indicated by the graduations on the transparent closure 172.

The shaft 72 is then rocked so that the cam 71 will swing the arm 69 and 69' outwardly from each other to rock the shaft 66 and 66' thus separating the friction drive wheels 74 and 74' so that they do not contact with the friction drive wheel 155. The shaft 86 is then rotated so as to move the carriage 82 outwardly toward the gear 153 carrying with it the friction drive disc 74 and the component parts. The shaft 104 is then moved axially outwardly so as to bring the recess 116 into registration with the plunger 117. This will swing through the toggle action of the arm 115, link 119, and arms 123, the shaft 126 outwardly so that the worm 125 is not in mesh with the gear 95. A rotation of the shaft 104 will serve to move the rack bar 102 until the pointer 107 indicates on the graduation plate 108, the same number of feet which are indicated on the graduated scale on the closure 172. Through a rotation of the gear 101 the rack bar 93 will have been moved to bring the friction drive wheel 155 into the proper position relatively to the friction drive disc 74'. The shaft 104 is then moved longitudinally to the position shown in Fig. 5 thus permitting the worm 125 to again mesh with the gear 95. The shaft 86 is then rotated so as to move the rack bar 84 inwardly of the housing until the projecting end 75 of the shaft 59 engages a flange on the friction drive wheel 155 thus indicating that the friction drive disc 74 has been moved to its proper position. The shaft 72 is then rotated to the position shown in Fig. 4 so as to permit the friction drive discs to again engage the tire 158 on the friction drive wheel 155. As the feeding of the film continues, the motor is then set in operation for operating the mechanism and as the feeding of the film continues, the gear 101 will rotate so as to move the rack bar 102 longitudinally outwardly from the housing so that the pointer 107 will always indicate on the graduated plate 108 substantially the same readings which are indicated by the graduations on the transparent closure 172. In this way the operator may determine at a glance, the condition of the film and the amount which is still unwound.

The mechanism described need not necessarily be limited to its use on a projecting machine but may be utilized for feeding films for various purposes such as in cameras, film printing machines, developing machines, etc.

The advantages would be present wherever a film is fed, as with the present feed mechanism, the feed sprocket and the take-up sprocket merely control the passage of the film to the intermittent sprocket so that the wear on the film by these sprockets is practically eliminated.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. In a film feeding mechanism: a pair of reel rotating means; a pair of rotatable members, each adapted for driving one of said reel rotating means; means for driving said members, said means being movable relatively to the axes of rotation of said members; and means for moving said driving means relatively to the axes of rotation of said rotatable members.

2. In a film feeding mechanism: a pair of rotatable members; reel rotating means connected to each of said rotatable members and actuated for rotating a reel upon rotation of said rotatable members; a driving means for rotating said rotatable members and positioned between the axes of rotation of said rotatable members, the axes of said rotation of said rotatable members being out of alignment.

3. In a device of the class described: a pair of rotatable members rotatable on non-aligned axes; a driving member for rotating said rotatable members and positioned between said axes of rotation and engaging opposed faces of said rotatable members; means for moving said driving member relatively to said axes of rotation; and means for moving said rotatable members out of operative position relatively to said driving member.

4. In a device of the class described: a pair of rotatable members rotatable on non-aligned axes; a driving member for rotating said rotatable members and positioned between said axes of rotation and engaging opposed faces of said rotatable members; and means for moving said driving member relatively to said axes of rotation; means automatically operable upon rotation of said rotatable members for moving said driving member relatively to the axes of rotation of said rotatable members.

5. In a device of the class described: a pair of spaced reel supporting members each adapted for supporting a reel; separate means for rotating a reel positioned on each of said supporting members; a pair of rotatable members, the axes of rotation of said members being non-aligned, said rotatable members being movable radially of each other.

6. In a device of the class described: a pair of spaced reel supporting members each adapted for supporting a reel; separate means for rotating a reel positioned on each of said supporting members; a pair of rotatable members, the axes of rotation of said members being non-aligned, said rotatable members being movable radially of each other; and means for moving said rotatable members radially of each other.

7. In a device of the class described: a pair of spaced reel supporting members each adapted for supporting a reel; separate means for rotating a reel positioned on each of said supporting members; a pair of rotatable members, the axes of rotation of said members being non-aligned, said rotatable members being movable radially of each other; and means for moving said rotatable members radially of each other; means for actuating said rotating means regardless of the radial relative position of said rotatable members.

8. In a device of the class described: a pair of supports each adapted for supporting a reel; individual means for rotating a reel on each of said supports; means for actuating said rotating means; and a yieldable releasing mechanism for each of said rotating means adapted upon development in its rotating means of abnormal resistance for releasing said rotating means from actuation by said actuating means.

9. In a device of the class described: a pair of rotatable members; rotatable means for driving said rotatable members and engageable therewith; means for moving said rotatable members out of engagement with said rotatable means; and resilient means for resisting movement of said rotatable members out of engagement with said rotating means.

10. In a device of the class described: a pair of rotatable members rotating on parallel non-aligned axes; a drive member engaging opposed faces of said rotatable members and positioned between said axes and movable relatively thereto; means for automatically moving said driving member relatively to said axes upon rotation of said rotatable members; and an indicating member for indicating the amount of movement of said driving member.

11. In a device of the class described: a pair of reel supports, each adapted for supporting a reel; a reel mounted on each of said supports; individual means for driving each of said reels; a pair of rotatable members each adapted for actuating one of said driving means; a driving member engageable with and movable relatively to the axes of rotation of said rotatable members and adapted for rotating said rotatable members; means upon rotating of said rotatable members for moving said driving member relatively to said axes of rotation; means for indicating the amount of movement of said driving member relatively to said axes; and co-operating means for indicating the amount of material unwound from one reel.

12. In a device of the class described: a pair of reel supports; each adapted for supporting a reel; rotating means for rotating a reel on each of said supports; means for actuating each of said rotating means; means for operating said actuating means; and a releasable clutch for releasing the connection between said actuating means and said rotating means upon development in said rotating means of abnormal resistance.

13. In a device of the class described: a pair of rotatable members adapted for rotating on non-aligned axes; a driving member engageable with opposed faces of said rotatable members and adapted upon a rotation for rotating said rotatable members; a slidable member for supporting said driving member; and means operable upon rotating of said rotatable members for sliding said slidable member and moving said driving member relatively to said axes.

14. In a device of the class described: a pair of rotatable members adapted for rotating on non-aligned axes; a driving member engageable with opposed faces of said rotatable members and adapted upon a rotation for rotating said rotatable members; a slidable member for supporting said driving member; and a rack and gear mechanism for moving said driving member relatively to said axes.

15. In a film feeding mechanism: a pair of rotatable members rotatable on non-aligned axes; a driving member positioned between the axes of rotation of and engaging opposing faces of said rotatable members and rotating the same; means for moving said driving member relatively to said axes of rotation; and means for moving said rotatable members individually relatively to said driving member into and out of engagement therewith.

16. In a device of the class described: a pair of spaced reel supporting members each adapted for supporting a reel; separate means for rotating a reel positioned on each of said supporting members; a pair of rotatable members each adapted for operating one of said reel rotating means, the axes of rotation of said members being non-aligned, said rotatable members being movable radially of each other; a driving member positioned between and engaging opposite faces of said rotatable members, between their axes of rotation for rotating the same; and means for moving said driving member relatively to said axes of rotation.

17. In a device of the class described: a pair of spaced reel supporting members each adapted for supporting a reel; separate means for rotating a reel positioned on each of said supporting members; a pair of spaced rotatable members, the axes of rotation of said members being parallel, said rotatable members being movable radially of each other; and a rotatable driving member positioned between and engaging opposing faces of said rotatable members for rotating the same, said driving member being radially movable relatively to the axes of said rotatable members.

18. In a device of the class described: a pair of rotatable members rotating on parallel non-aligned axes; a driving member engaging opposite faces of said rotatable members and positioned between said axes and movable relatively thereto; means for moving one of said rotatable members radially relatively to the other; and means for moving said driving member radially relatively to said rotatable members.

19. In a device of the class described: a pair of rotatable members rotating on parallel non-aligned axes; a driving member engaging opposing faces of said rotatable members and positioned between said axes and movable radially of said axes; means for automatically moving said driving member radially of said axes upon rotation of said rotatable members; means for manually moving said driving member radially to said axes upon rotation of said rotatable members; and means for rendering said automatic moving means and said manually moving means operative and inoperative.

20. In a device of the class described: a pair of rotatable members rotatable on non-aligned axes; a driving member for rotating said rotatable members and positioned between said axes of rotation and engaging opposing faces of said rotatable member; and means for varying the rate of transmission of movement from said driving member to one of said rotatable members while maintaining constant the rate of transmission to the other of said rotatable members.

DUANE MOWAT.